(12) United States Patent
Choi et al.

(10) Patent No.: US 9,363,062 B2
(45) Date of Patent: Jun. 7, 2016

(54) METHOD AND APPARATUS FOR TRANSMITTING AND RECEIVING PERIODIC CHANNEL INFORMATION IN WIRELESS COMMUNICATION SYSTEM

(71) Applicant: Samsung Electronics Co., Ltd., Gyeonggi-do (KR)

(72) Inventors: Seung-Hoon Choi, Gyeonggi-do (KR); Joon-Young Cho, Gyeonggi-do (KR); Ki-Il Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/551,730

(22) Filed: Nov. 24, 2014

(65) Prior Publication Data
US 2015/0078314 A1    Mar. 19, 2015

Related U.S. Application Data

(63) Continuation of application No. 13/722,009, filed on Dec. 20, 2012, now Pat. No. 8,897,273.

(30) Foreign Application Priority Data

Dec. 20, 2011   (KR) .................. 10-2011-0138310

(51) Int. Cl.
| | | |
|---|---|---|
| *H04Q 7/00* | (2006.01) |
| *H04L 5/00* | (2006.01) |
| *H04W 72/04* | (2009.01) |
| *H04L 1/00* | (2006.01) |

(52) U.S. Cl.
CPC ............ *H04L 5/0053* (2013.01); *H04L 1/0026* (2013.01); *H04L 1/0027* (2013.01); *H04L 5/0057* (2013.01); *H04W 72/04* (2013.01); *H04W 72/042* (2013.01); *H04L 5/001* (2013.01)

(58) Field of Classification Search
None
See application file for complete search history.

(56) References Cited

U.S. PATENT DOCUMENTS 8,427,976 B1*   4/2013   Dinan ............... H04W 36/0072
                                                 370/252
2009/0316626 A1   12/2009   Lee et al.
(Continued)

FOREIGN PATENT DOCUMENTS

WO   WO 2011/132993   10/2011

OTHER PUBLICATIONS

Samsung, "Multiplexing Periodic CSI Reports on Subframes with PUSCH", R1-110067, 3GPP TSG RAN WG1 Meeting #63bis, Jan. 17, 2011.

(Continued)

*Primary Examiner* — Duc C Ho
(74) *Attorney, Agent, or Firm* — The Farrell Law Firm, P.C.

(57) ABSTRACT

A method and apparatus in which a terminal transmits channel information for at least one serving cell to a base station in a wireless communication system is provided. The method for receiving periodic channel information by a base station in a wireless communication system includes determining whether to set a Physical Uplink Shared CHannel (PUSCH) mode for allowing a terminal to periodically transmit a plurality of channel information to the base station in one subframe, transmitting PUSCH mode information including a result of the determination to the terminal, and receiving the plurality of channel information from the terminal using a PUSCH in the one sub-frame, according to the result of the determination.

20 Claims, 6 Drawing Sheets

(56) References Cited

U.S. PATENT DOCUMENTS

| | | |
|---|---|---|
| 2011/0243012 A1 | 10/2011 | Luo et al. |
| 2011/0305161 A1 | 12/2011 | Ekpenyong et al. |
| 2012/0120903 A1* | 5/2012 | Kim ............... H04B 7/024 370/329 |
| 2012/0257531 A1* | 10/2012 | Ko ............... H04B 7/0417 370/252 |
| 2013/0114554 A1* | 5/2013 | Yang et al. ............ 370/329 |
| 2013/0148613 A1* | 6/2013 | Han et al. ............ 370/329 |
| 2014/0140281 A1* | 5/2014 | Choudhury et al. ...... 370/328 |

OTHER PUBLICATIONS

Alcatel-Lucent et al., "Enhancement on Periodic CSI Report for Carrier Aggregation", R1-114040, 3GPP TSG RAN WG1 Meeting #67, Nov. 14-18, 2011, 3 pages.

Motorola, "PDCCH Formats (A) for Scheduling Grants", R1-074000, 3GPP TSG RAN 1 #50bis, Oct. 8-12, 2007, 3 pages.

European Search Report dated Aug. 6, 2015 issued in counterpart application No. 12859088.2-1851, 7 pages.

* cited by examiner

METHOD AND APPARATUS FOR TRANSMITTING AND RECEIVING PERIODIC CHANNEL INFORMATION IN WIRELESS COMMUNICATION SYSTEM

PRIORITY

This application is a continuation application of U.S. patent application Ser. No. 13/722,009 filed on Dec. 20, 2012, which claims priority under 35 U.S.C. §119(a) to a Korean Patent Application filed in the Korean Intellectual Property Office on Dec. 20, 2011 and assigned Serial No. 10-2011-0138310, the entire disclosure of which is hereby incorporated by reference.

BACKGROUND OF THE INVENTION

1. Field of the Invention

The present invention relates to a method and apparatus in which a terminal transmits channel information for at least one serving cell to a base station in a wireless communication system, and more particularly, to a method and apparatus for transmitting and receiving periodic channel information in a wireless communication system.

2. Description of the Related Art

Generally, mobile communication systems have been developed to provide voice services, to allow for mobility of a user. Mobile communication systems have expanded data services as well as voice services, and now, they are capable of providing high-speed data services. However, in mobile communication systems which currently provide services, due to a shortage of resources and user's demands for higher-speed services, mobile communication systems are required which are further developed.

To meet such demands, standardization work on Long Term Evolution (LTE), one of the next-generation mobile communication systems, is in progress in the 3$^{rd}$ Generation Partnership Project (3GPP). LTE implements high-speed packet-based communication at a data rate of up to about 100 Mbps. To this end, various schemes have been discussed, such as a scheme for reducing the number of nodes located on a communication path by simplifying a structure of a network and a scheme for arranging wireless protocols close to wireless channels.

In 3GPP LTE release-10 (rel-10), to support higher data transmission quantity than LTE rel-8, a bandwidth extension technique has been adopted. Bandwidth extension, also called Carrier Aggregation (CA), may extend a band, thus increasing data transmission quantity by the extended band when compared to an LTE rel-8 terminal for transmitting data in a band. Each band is called a Component Carrier (CC), and the LTE rel-8 terminal is prescribed to have one CC for each of a Downlink (DL) and an Uplink (UL). UL CCs, which are SIB-2 connected with DL CCs, are called a cell. The SIB-2 connection relationship between the UL CCs and the DL CCs is transmitted as a terminal-dedicated signal. A terminal which supports CA may receive DL data and transmit UL data through multiple serving cells.

When a base station has difficulty in sending a Physical Downlink Control CHannel (PDCCH) to a particular terminal in a particular serving cell in LTE rel-10, it transmits the PDCCH to the terminal in another serving cell and sets a Carrier Indicator Field (CIF) as a field for indicating that the PDCCH indicates a Physical Downlink Shared CHannel (PDSCH) or a Physical Uplink Shared CHannel (PUSCH) of the another serving cell. The CIF may be set in the terminal which supports CA. The CIF is determined to indicate the another serving cell by adding 3 bits to the PDCCH information in the particular serving cell. The CIF is included only when cross carrier scheduling is performed. If the CIF is not included, cross carrier scheduling is not performed. When the CIF is included in a DL assignment, the CIF indicates a serving cell in which the PDSCH scheduled by the DL assignment is to be transmitted. If the CIF is included in a UL grant, the CIF is defined to indicate a serving cell in which the PUSCH scheduled by the UL grant is to be transmitted.

As such, in LTE rel-10, the bandwidth extension technique CA is defined, such that multiple serving cells may be set in a terminal. For data scheduling of the base station, the terminal periodically or aperiodically transmits channel information for the multiple serving cells to the base station.

In LTE rel-11, a maximum of five serving cell setting scenarios are assumed, and in this case, channel information transmission for multiple serving cells in one sub-frame may collide with each other. Thus, a need exists for a method for supporting an operation of the terminal such that channel information for as many serving cells as possible may be periodically transmitted in one sub-frame.

SUMMARY OF THE INVENTION

Accordingly, the present invention is provided to address at least the above-described problems and provide at least the advantages described below.

Accordingly, the present invention provides a method and apparatus for transmitting channel information for multiple serving cells at a terminal in a wireless communication system, without wasting transmission resources of a DL control channel.

The present invention also provides a method and apparatus for increasing a transmission quantity by receiving channel information periodically transmitted from a terminal and performing optimal scheduling for serving cells.

According to an aspect of the present invention, there is provided a method for receiving periodic channel information by a base station in a wireless communication system, the method including determining whether to set a Physical Uplink Shared CHannel (PUSCH) mode for allowing a terminal to periodically transmit a plurality of channel information to the base station in one sub-frame, transmitting PUSCH mode information including a result of the determination to the terminal, and receiving the plurality of channel information from the terminal using a PUSCH in the one sub-frame, according to the result of the determination.

According to another aspect of the present invention, there is provided a method for transmitting periodic channel information by a terminal in a wireless communication system, the method including receiving Physical Uplink Shared CHannel (PUSCH) mode information from a base station, determining based on the PUSCH mode information whether a PUSCH mode is set to periodically transmit a plurality of channel information to the base station in one sub-frame, and transmitting the plurality of channel information to the base station using a PUSCH in the one sub-frame, according to a result of the determination.

According to another aspect of the present invention, there is provided a base station in a wireless communication system, the base station including a controller for determining whether to set a Physical Uplink Shared CHannel (PUSCH) mode for allowing a terminal to periodically transmit a plurality of channel information to the base station in one sub-frame, a transmitter for transmitting PUSCH mode information including a result of the determination to the terminal, and a receiver for receiving the plurality of channel information from the terminal using a PUSCH in the one sub-frame, according to the result of the determination.

According to another aspect of the present invention, there is provided a terminal in a wireless communication system, the terminal including a receiver for receiving Physical Uplink Shared CHannel (PUSCH) mode information from a base station, a controller for determining based on the PUSCH mode information whether a PUSCH mode is set to periodically transmit a plurality of channel information to the base station in one sub-frame, and a transmitter for transmitting the plurality of channel information to the base station using a PUSCH in the one sub-frame, according to a result of the determination.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE PRESENT INVENTION

Figure 1:
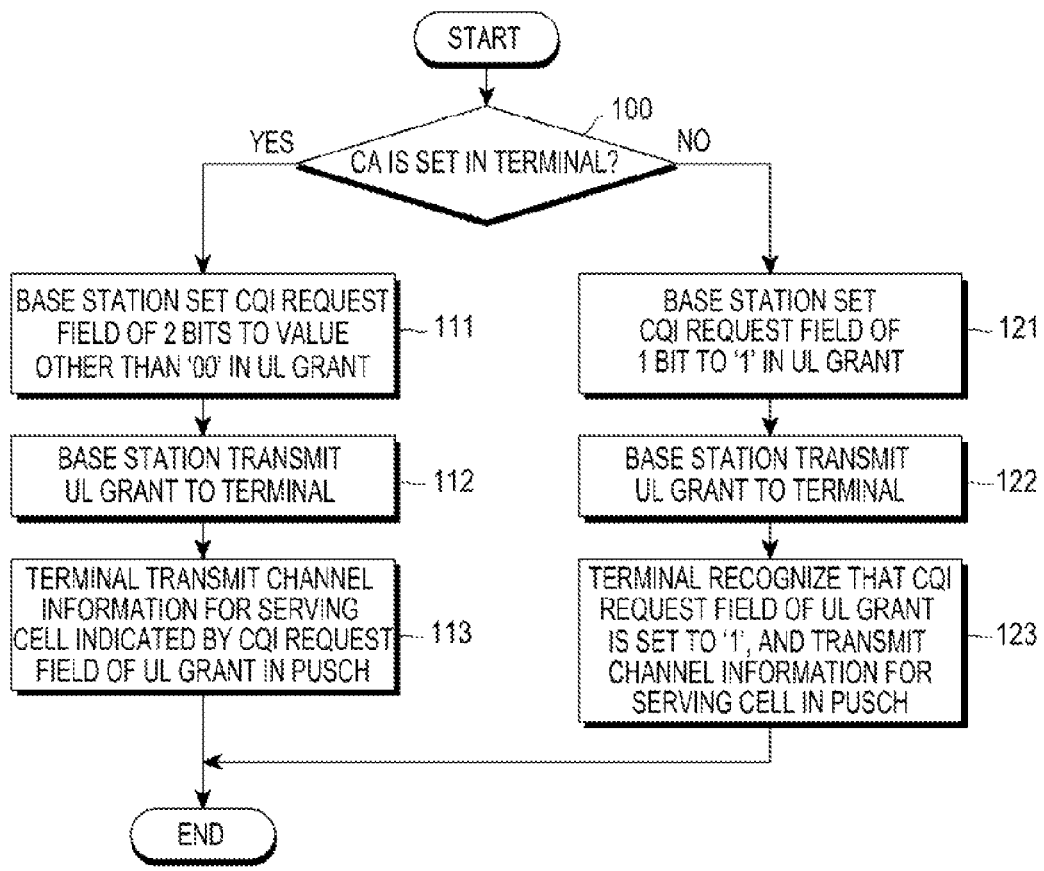
FIG. 1 is a flowchart illustrating a process of requesting and transmitting aperiodic channel information in LTE rel-10.

Embodiments of the present invention will now be described in detail with reference to the annexed drawings. It should be noted that throughout the drawings, like reference numerals refer to like components. In the following description, known functions and configurations will not be described in detail if they unnecessarily obscure the subject matter of the present invention.

When an embodiment of the present invention is described, an Advanced Evolved Universal Terrestrial Radio Access (E-UTRA), or LTE-Advanced (LTE-A), system which supports CA will be focused on, but the subject matter of the present invention is also applicable to other communication systems having similar technical backgrounds and channel forms in a scope which does not largely depart from the scope of the present invention with some modifications. Such an application may also be possible by determination of those of ordinary skill in the art. For example, the subject matter of the present invention may also be applied to a multicarrier High Speed Packet Access (HSPA) scheme which supports CA.

If there is data to be transmitted, the LTE rel-10 terminal receives scheduling information for PUSCH transmission from a base station through a PDCCH. The scheduling information is also called UL resource assignment information (or a UL grant), and in the LTE rel-10, Downlink Control Information (DCI) formats 0 and 4 are defined as the UL grant. The base station may send a request for aperiodic channel information, or an aperiodic Channel Quality Indicator (CQI), to the terminal by using a channel information request field, or CQI request field, of the UL grant. The CQI request field is of 1 bit when CA is not supported; if CA is supported, the CQI request field is of 2 bits. The terminal having received the CQI request field of 1 bit checks the CQI request field, and upon receiving the CQI request, multiplexes the channel information for a serving cell in which the UL grant is transmitted with data of a PUSCH, and transmits the multiplexed channel information to the base station. The terminal having received the CQI request field of 2 bits checks the CQI request field, and upon receiving the CQI request, multiplexes channel information for a serving cell indicated by the CQI request field with data of the PUSCH and transmits the multiplexed channel information to the base station.

Next, referring to FIG. 1, a detailed description will be made of a process of requesting and transmitting the aperiodic CQI when the CQI request field is of 1 bit and the CQI request field is of 2 bits.

FIG. 1 is a flowchart illustrating a process of requesting and transmitting the aperiodic CQI in LTE rel-10.

In FIG. 1, a CQI request field of a different bit is set by a base station according to whether CA is set for an LTE rel-10 terminal. If CA is set for the terminal in step 100, the base station sets a CQI request field of 2 bits in a UL grant in step 111. In this case, when sending a channel information request or a CQI request, the base station sets the CQI request field of 2 bits with a value desired by the base station, except for '00'. '01' corresponds to the CQI request with respect to a serving cell in which the PUSCH is transmitted, and '10' and '11' correspond to the CQI request with respect to a serving cell to be set in Radio Resource Control (RRC).

In step 112, the base station transmits a UL grant in which the CQI request is set to the terminal. In step 113, the terminal, after receiving the UL grant, transmits the channel information for a serving cell indicated by the CQI request field in the PUSCH. The serving cell indicated by the CQI request and the serving cell in which the PUSCH is transmitted may be the same as or different from each other.

Referring back to step 100, if CA is not set in the terminal, then the base station sets the CQI request field of 1 bit in the UL grant and sets the CQI request field to 1 to request the channel information in step 121. In step 122, the base station transmits the UL grant in which the CQI request is set to the terminal. In step 123, the terminal receives the UL grant, recognizes the CQI request, and transmits channel information for a serving cell in which the UL grant is transmitted in the PUSCH. The serving cell indicated by the CQI request and the serving cell in which the PUSCH is transmitted are the same as each other. In step 113 or 123, when the aperiodic CQI information is transmitted, it is multiplexed with data the terminal desires to transmit and is transmitted in the PUSCH. However, in the present invention, this process is simply referred to as transmission of the channel information in the PUSCH. Also in the following description, a description of the multiplexing procedure will be omitted.

In LTE Rel-10, CA is defined, and multiple serving cells may be set in the terminal. For data scheduling of the base station, with higher-layer information, the terminal is set to periodically transmit channel information as well as to aperiodically transmit channel information as described in FIG. 1.

In an embodiment of the present invention described below, an operation of periodically transmitting channel information will be referred to as periodic channel information transmission, and periodic channel information is transmitted through a Physical Uplink Control Channel (PUCCH) of a primary serving cell (Pcell). For a CA-set terminal, each serving cell independently defines periodic channel information transmission. Types of information to be transmitted in periodic channel information transmission may include a sub-band CQI; a sub-band CQI and a second Precoding Matrix Indicator (PMI); a wideband CQI and a PMI; a wideband first PMI, a wideband CQI and a second PMI; a wideband CQI, a first PMI, and a second PMI; a Rank Indicator (RI), a wideband CQI, an RI and a first PMI; and an RI and a Precoder Type Indicator (PTI).

Out of those types of information, information to be transmitted is determined according to a transmission mode based on higher-layer information, and such transmission information is set to have respective periods and offsets according to the higher-layer information.

In periodic channel information transmission, if periodic channel information transmission time instants for multiple serving cells coincide with each other in one sub-frame, only periodic channel information for only one serving cell is designed to be transmitted in a PUCCH of the Pcell in one sub-frame. In one serving cell, if transmission time instants of multiple channel information coincide with each other in one sub-frame, only single channel information is transmitted. In this case, the priorities of periodic channel information which is set to be transmitted for multiple serving cells are determined using types of information to be transmitted and serving cell indices, such that only periodic channel information for one serving cell is transmitted and periodic channel information for the other serving cells is discarded.

For example, if transmission time instants of multiple channel information for one serving cell coincide with each other, channel information including an RI has the highest priority; if transmission time instants of channel information for multiple serving cells coincide with each other, channel information including an RI or a first PMI has the highest priority and channel information including a wideband CQI has the next highest priority. If channel information having equal priorities are transmitted for different serving cells, channel information having a lower serving cell index has the higher priority. Actually, in LTE rel-10, a scenario of setting of two serving cells is assumed, such that there is not much periodic channel information transmission collision for multiple serving cells. In addition, the base station may differently set periodic channel information transmission periods and offsets for the serving cells, thereby easily avoiding such collisions.

However, if a scenario of setting of up to five serving cells is assumed as in LTE rel-11, it is difficult to avoid periodic channel information transmission collisions for the multiple serving cells merely by differently setting periodic channel information transmission periods and offsets for the serving cells at the base station. As a result, the probability of coincidence between channel information transmission time instants in one sub-frame is far higher than in LTE rel-10. Moreover, if, as defined in LTE rel-10, the terminal transmits single periodic channel information only in one serving cell and periodic channel information for the other serving cells are discarded, then the base station may have a difficulty in performing optimal scheduling for the other serving cells, negatively affecting the amount of data transmission to the terminal.

If the base station transmits a UL grant including an aperiodic channel information request to transmit channel information for the multiple serving cells, the base station has to transmit the UL grant in each serving cell or each time when periodic channel information transmission time instants for the multiple serving cells coincide with each other, wasting PDCCH transmission resources and thus reducing PDCCH resources for scheduling of other terminals in the base station. Therefore, if setting of up to five serving cells is supported for CA in LTE rel-11, a need exists for a method for supporting periodic channel information transmission for as many serving cells as possible in one sub-frame without needing PDCCH transmission resources.

In an embodiment of the present invention described below, a description will be made of a method for transmitting channel information for multiple serving cells at a terminal, without wasting transmission resources of a DL control channel in a wireless communication system which supports CA.

The present invention is structured as described below.

A method for setting periodic channel information transmission for multiple serving cells at a base station and a method for transmitting channel information for the serving cells at a terminal are provided, without wasting PDCCH transmission resources in a CA situation. A solution to collisions between various UL transmission channels in the same sub-frame will also be described with regards to an embodiment of the present invention.

First, a description will be made of a method for setting Uplink Control Information (UCI) PUSCH transmission at the base station without wasting PDCCH transmission resources, to allow the terminal to transmit periodic channel information transmission for multiple serving cells.

A method of the present invention to prevent loss of much channel information due to coincidence between transmission time instants of multiple channel information when periodic channel information is transmitted through a PUCCH will be referred to as UCI PUSCH, which is a method for transmitting multiple channel information through a PUSCH.

A UCI PUSCH operation mode is set by a higher-layer signal. In an embodiment of the present invention, the higher-layer signal will be defined as UCIPUSCHmode. If UCIPUSCHmode is 0, that is, if the UCI PUSCH operation mode is not set, the terminal performs the LTE rel-10 operation of transmitting single channel information through a PUCCH in one sub-frame when transmitting periodic channel information. If UCIPUSCHmode is 1, that is, if the UCI PUSCH operation mode is set, UCI PUSCH transmission is set in the terminal to allow the terminal to transmit a lot of channel information through the PUSCH in one sub-frame.

After the UCI PUSCH operation mode is set by the higher-layer signal, the UCI PUSCH operation of the terminal is activated as described below. First, if transmission time instants of two or more different channel information for one serving cell coincide with each other in one sub-frame, UCI PUSCH instead of PUCCH is activated. Next, if transmission time instants of two or more different channel information for different serving cells coincide with each other in one sub-frame, UCI PUSCH instead of PUCCH is activated. The two or more channel information for the different serving cells may be of the same type or may be of different types.

Once UCI PUSCH is activated, the terminal multiplexes preset channel information for at least one serving cell by using a preset method for transmission in the PUSCH. The preset channel information may include channel information corresponding to periodic channel transmission settings, which are set to be transmitted for the respective serving cells. As another example, the preset channel information may also include not only single channel information which may be originally transmitted, but also channel information which may not be transmitted due to coinciding channel information transmission time instants. The preset method for multiplexing the channel information multiplexes the channel information in an order corresponding to serving cell indices and channel information types. That is, the channel information set to be transmitted may be first arranged according to serving cell indices and then arranged according to channel information types. Alternatively, the channel information set to be transmitted is first arranged according to channel information types and then arranged according to serving cell indices.

The multiplexed channel information are encoded at a preset encoding rate and modulated by a preset modulation scheme, and are transmitted to the base station on a preset transmission resource through the PUSCH. The encoding rate, the modulation scheme, and the transmission resource may be set by a higher-layer signal similar to the UCI PUSCH operation mode setting. As another example, the encoding rate, the modulation scheme, and an initial position of a resource, that is, a start position of an initial Physical Resource Block (PRB), are set by a higher-layer signal, and the position of the resource, that is, the start position of the PRB, may be differently set by a predefined hopping pattern each time when channel information transmission time instants coincide with each other. As inputs of the hopping pattern, for example, an RNTI (Radio Network Temporary Identifier), a sub-frame number, and an initial position of a resource may be set.

In addition to the start position of the PRB, a transmission resource quantity for determining transmission resources has to be set as well. To set the transmission resource quantity, for example, the transmission resources may be predefined based on a resource quantity which is required in transmission of channel information, which could not be transmitted due to coinciding transmission time instants. It is assumed that the number of bits of channel information to be transmitted due to coinciding transmission time instants is x and a resource quantity required based on a beta value, which is used to determine (adjust) a necessary resource quantity, is y PRBs. If the number of bits of channel information to be transmitted due to coinciding transmission time instants is greater than x and less than 2x, then the resource quantity is 2y PRBs. If the number of bits of channel information to be transmitted due to coinciding transmission time instants is greater than 2x and less than 3x, then the resource quantity is 3y PRBs. If the number of bits of channel information to be transmitted due to coinciding transmission time instants is greater than 3x and less than 4x, then the resource quantity is 4y PRBs. Likewise, if the number of bits of channel information to be transmitted due to coinciding transmission time instants is greater than 4x and less than 5x, then the resource quantity is 5y PRBs.

As another example for setting the transmission resource quantity, the transmission resources may be predefined as in Table 1 by considering the number of channel information which could not be transmitted due to coinciding transmission time instants.

TABLE 1

| Number of PRBs (Physical Resource Blocks) | Channel Information Having Coinciding Transmission Time Instants (x) |
|---|---|
| 1 | $0 < x \leq 2$ |
| 2 | $2 < x \leq 4$ |
| 3 | $4 < x \leq 6$ |
| 4 | $6 < x \leq 8$ |
| 5 | $8 < x \leq 10$ |

Next, serving cells for performing UCI PUSCH transmission will be described. According to an embodiment of the present invention, the serving cell for transmission of the UCI PUSCH may be the Pcell. The Pcell is set to transmit a PUCCH, such that when collision occurs between two or more periodic channel information transmissions, the Pcell transmits the UCI PUSCH instead of the PUCCH and transmits UCI to be transmitted in the PUCCH through the UCI PUSCH in every transmission of the UCI PUSCH, thereby reducing PUCCH transmission power.

The serving cell for UCI PUSCH transmission may also be a Secondary cell (Scell). In this case, one Scell may be selected from among multiple Scells using cell indices. For example, a Scell having the lowest cell index may be selected. If the UCI PUSCH is transmitted in the Scell, UCI transmission from the terminal may be simply defined. For example, when different TDD UL-DL configurations are applied between inter-bands in inter-band Time Division Duplexing (TDD) CA, UCI transmission timings are different in the Scell and the Pcell, and therefore, a new terminal procedure has to be defined when UCI for the Scell are transmitted in the Pcell. However, if the UCI PUSCH is transmitted in the Scell, the UCI for the Scell may be transmitted on the Scell, such that it is not necessary to define a new terminal procedure.

Figure 2:
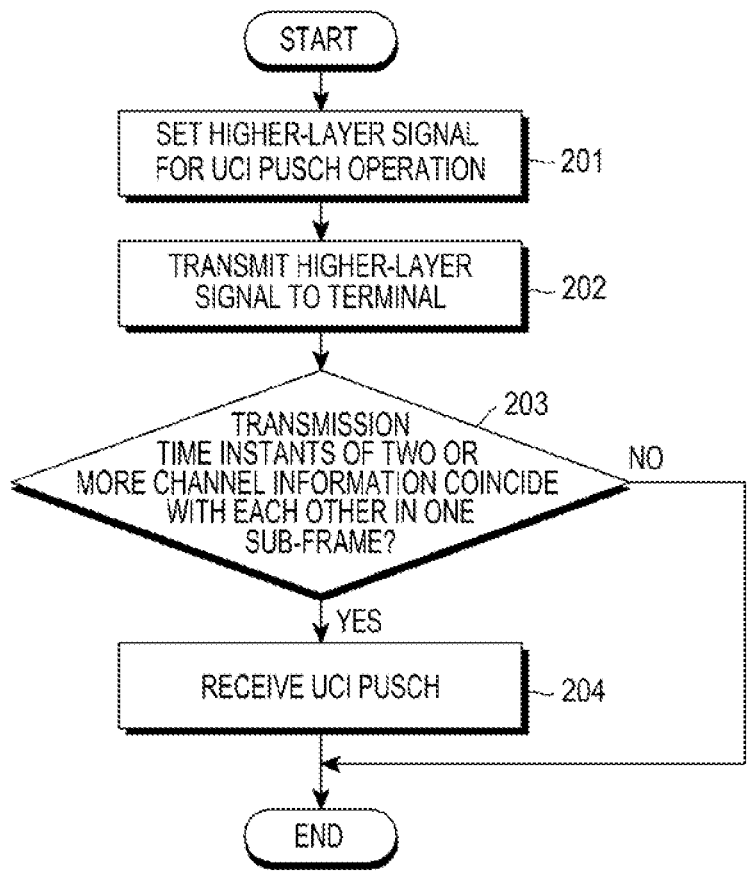
FIG. 2 is a flowchart illustrating a process of setting an Uplink Control Information (UCI) PUSCH transmission mode and receiving a UCI PUSCH to transmit channel information for multiple serving cells at a base station according to the present invention.
Figure 3:
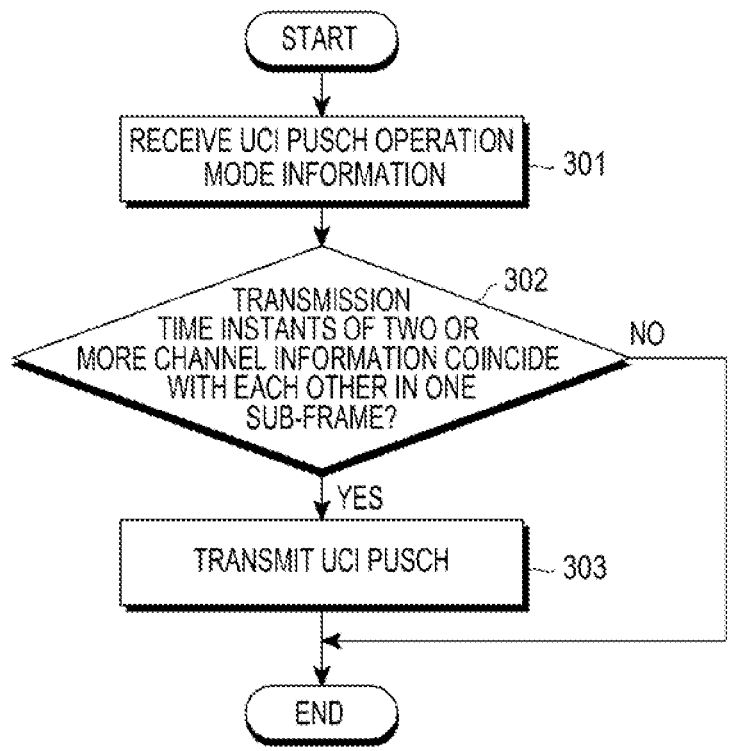
FIG. 3 is a flowchart illustrating a process of transmitting channel information for multiple serving cells through a UCI PUSCH at a terminal according to the present invention.

Referring to FIGS. 2 and 3, a description will be made of a process of setting UCI PUSCH transmission to transmit channel information for multiple cells at the base station and a process of transmitting the UCI PUSCH for the channel information for the multiple serving cells at the terminal according to an embodiment of the present invention.

First, the operation of the base station will be described with reference to FIG. 2. FIG. 2 is a flowchart illustrating a process of setting the UCI PUSCH to transmit channel information for multiple serving cells at the base station according to an embodiment of the present invention.

In step 201, the base station sets a higher-layer signal for an UCI PUSCH operation according to the embodiment of the present invention. In step 202, the base station transmits the higher-layer signal to the terminal. In step 203, the base station determines whether transmission time instants of two or more periodic channel information coincide with each other in one sub-frame. If so, the base station receives a UCI PUSCH transmitted from the terminal in step 204; otherwise, if the transmission time instants of two or more periodic channel information do not coincide with each other, the base station terminates the process. After step 204, the base station may transmit a HARQ-ACK to the terminal as a feedback indicating normal reception of the UCI PUSCH.

The operation of the terminal will be described with reference to FIG. 3. FIG. 3 is a flowchart illustrating a process of transmitting channel information for multiple serving cells at the terminal according to an embodiment of the present invention. In FIG. 3, the higher-layer signal received from the base station corresponds to the UCI PUSCH operation mode.

In step 301, the terminal receives the UCI PUSCH operation mode information from the base station. In step 302, the terminal determines whether transmission time instants of two or more periodic channel information coincide with each other in one sub-frame. If so, the terminal transmits the UCI PUSCH in a preset way according to the embodiment of the present invention, in step 303. After step 303, the terminal may receive a HARQ-ACK from the base station as a feedback indicating normal reception of the UCI PUSCH. If not, the terminal terminates the process.

Hereinafter, a description will be made of a terminal's operation upon occurrence of collision with another UL channel transmission when the UCI PUSCH operation mode is set and the UCI PUSCH is transmitted from the terminal.

First, if a UCI PUSCH transmission collides with a PUCCH transmission including the HARQ-ACK or the like in one sub-frame of the same serving cell, the terminal transmits UCI of the PUCCH having the collision through the UCI PUSCH and does not perform PUCCH transmission. By performing only UCI PUSCH transmission, the terminal's power consumed for the PUCCH transmission may be reduced. However, if HARQ-ACK bits for many cells need to be transmitted in the PUCCH, many HARQ-ACK bits have to be included in the UCI PUSCH, causing loss of a lot of channel information. Therefore, in this case, the terminal may perform only PUCCH transmission without performing UCI PUSCH transmission.

Second, if the UCI PUSCH transmission collides with the PUSCH transmission for general data transmission in one sub-frame of the same serving cell, the terminal transmits UCI of the UCI PUSCH having the collision through the PUSCH for general data transmission and does not perform UCI PUSCH transmission. The terminal performs only PUSCH transmission for general data transmission, thereby stably transmitting the UCI on many resources. This is because, since UCI PUSCH transmission has to use resources preset by the higher-layer signal, less resources than the PUSCH transmission for general data transmission are assigned by the higher-layer signal to prevent a particular terminal from monopolizing many resources.

Third, if the UCI PUSCH transmission collides with an aperiodic PUSCH transmission in one sub-frame of the same serving cell, the terminal transmits UCI of the UCI PUSCH having the collision through the aperiodic PUSCH and does not perform UCI PUSCH transmission. In this case, the terminal may perform only the aperiodic UCI PUSCH transmission, thereby stably transmitting the UCI on many resources.

Figure 4:
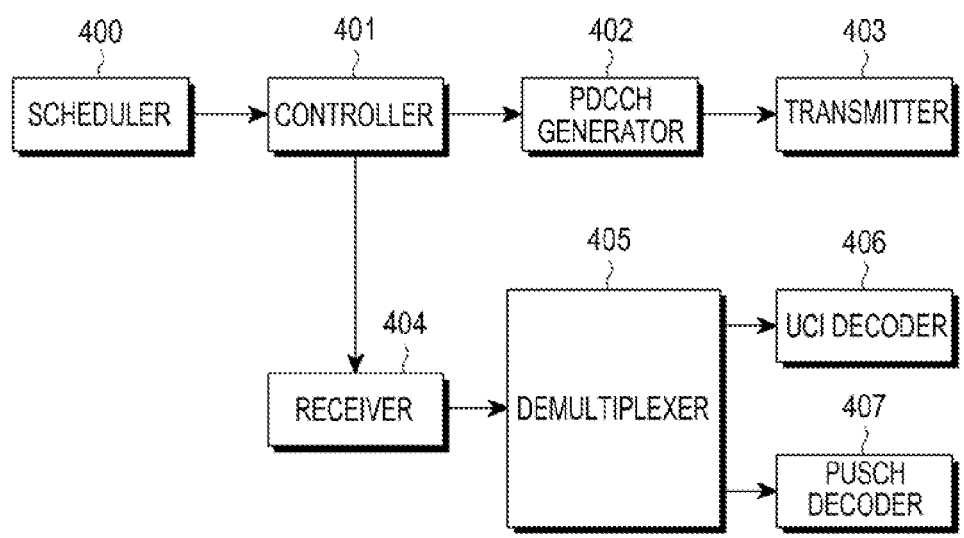
FIG. 4 is a block diagram illustrating a base station according to the present invention.

FIG. 4 is a block diagram illustrating the base station according to an embodiment of the present invention.

Referring to FIG. 4, a scheduler 400 and a controller 401 control a PDCCH generator 402 to configure a PDCCH and to transmit the PDCCH to a transmitter 403. In the present invention, a UL data channel transmitted from the terminal using a UCI PUSCH is received through a receiver 404 and periodic UCI information is separated by a demultiplexer 405. The periodic UCI information is decoded by a UCI decoder 406. If the periodic UCI information is multiplexed in a general UL data channel, the UL data channel transmitted from the terminal is received through the receiver 404 and UL data information and periodic UCI information are separated through the demultiplexer 405, such that the periodic UCI information is decoded by the UCI decoder 406 and the UL data information is decoded by a PUSCH decoder 407.

In particular, the controller 401 according to an embodiment of the present invention controls the operation of setting the UCI PUSCH operation mode to allow the terminal to transmit channel information for at least one serving cell to the base station, and the operation of transmitting the UCI PUSCH operation mode information to the terminal.

Figure 5:
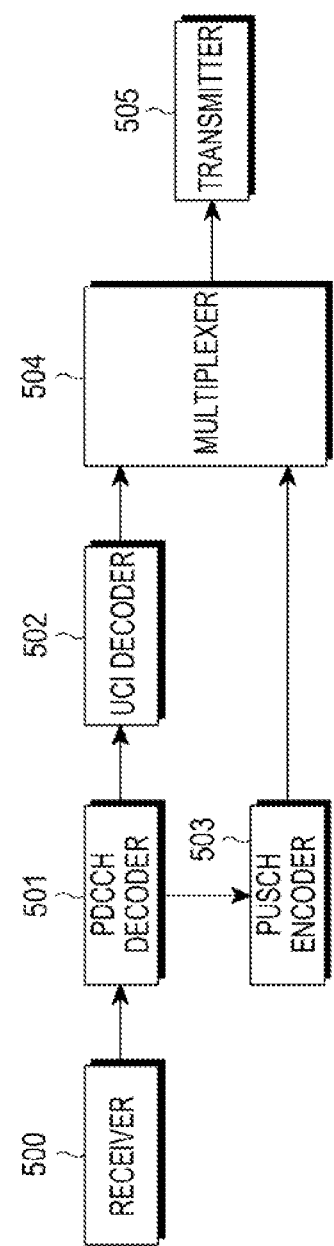
FIG. 5 is a block diagram illustrating a terminal according to the present invention.

FIG. 5 is a block diagram of the terminal according to an embodiment of the present invention.

Referring to FIG. 5, a signal received through a receiver 500 is received by a PDCCH decoder 501, and channel information according to the present invention is generated by a UCI encoder 502. Periodic UCI information are multiplexed in a UL data channel and transmitted to a transmitter 505 by a multiplexer 504 according to the present invention. If the periodic UCI information needs to be multiplexed in a general UL data channel, the channel information according to the present invention is generated by the UCI encoder 502, and UL data is generated by a PUSCH encoder 503. The periodic UCI information and the UL data are multiplexed in a UL data channel and transmitted to the transmitter 505 by the multiplexer 504.

While not illustrated in FIG. 5, the terminal may include a controller for receiving the UCI PUSCH operation mode information transmitted from the base station and transmitting channel information for at least one serving cell to the base station through the UCI PUSCH, if transmission time instants of two or more channel information coincide with each other in UCI PUSCH setting.

Figure 6:
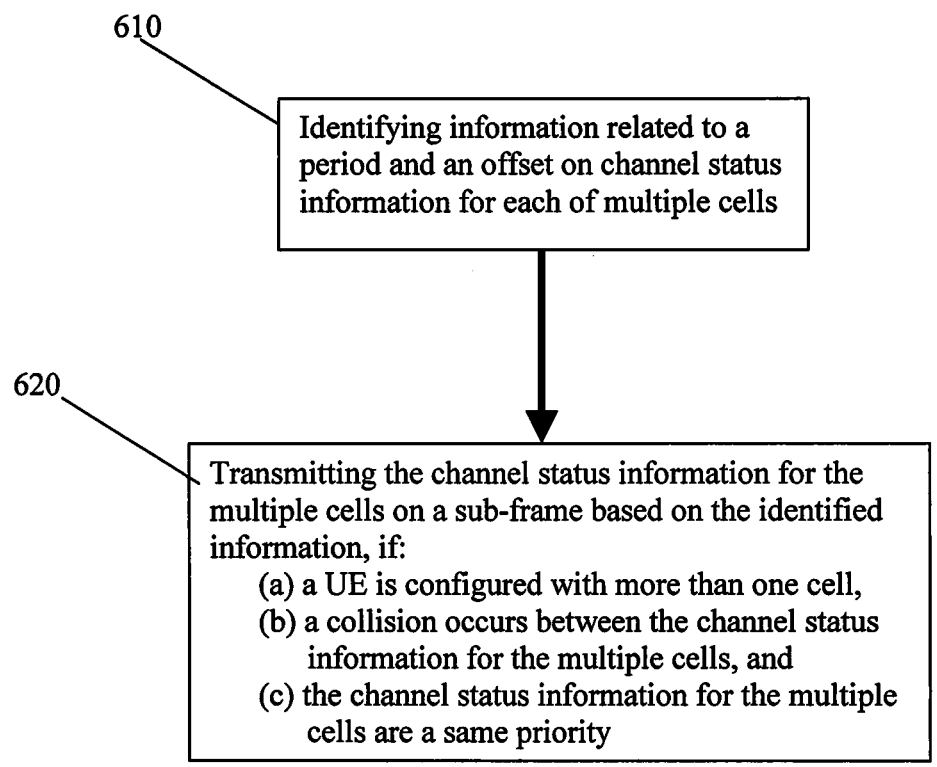
FIG. 6 is a flowchart illustrating a method according to the present invention.

FIG. 6 is a flowchart illustrating a method according to the present invention. In step 610, information related to a period and an offset on channel status information for each of multiple cells is identified. In step 620, if (a) a UE is configured with more than one cell, (b) a collision occurs between the channel status information for the multiple cells, and (c) the channel status information for the multiple cells are a same priority, the channel status information for the multiple cells is transmitted on a sub-frame based on the identified information.

According to the present invention, by using a method for preventing transmission resources for a PDCCH from being wasted in a wireless communication system which supports CA, the terminal can transmit channel information for multiple serving cells. The base station receives the channel information for the multiple serving cells from the terminal and performs optimal scheduling for the serving cells based on the received channel information for the multiple serving cells, thereby improving the transmission quantity.

While the embodiments of the present invention have been described in detail with reference to the accompanying drawings, the present invention is not limited thereto. It will be understood by those skilled in the art that various changes in form and details may be made therein without departing from the spirit and scope of the present invention as defined by the appended claims.

What is claimed is:

1. A method for transmitting channel information, the method comprising:
   identifying information related to a period and an offset on channel status information for each of multiple serving cells; and
   transmitting the channel status information for the multiple serving cells on a sub-frame based on the identified information, if (a) a UE is configured with more than one cell, (b) a collision occurs between the channel status information for the multiple serving cells, and (c) the channel status information for the multiple serving cells are a same priority.

2. The method of claim 1, wherein the channel status information for each of the multiple serving cells is transmitted on a Physical Uplink Shared Channel (PUSCH).

3. The method of claim 2, further comprising receiving resource information comprising at least one of information about a transmission resource quantity for the PUSCH and information about a resource block for the PUSCH.

4. The method of claim 1, further comprising receiving information indicating that multiple periodic channel information can be transmitted on one sub-frame.

5. The method of claim 4, further comprising transmitting channel status information from among the channel status information for each of multiple serving cells, if the information indicating multiple periodic channel information can be transmitted on one sub-frame is not received.

6. A method for receiving channel information, the method comprising:
   transmitting information related to a period and an offset on channel status information for each of multiple serving cells; and receiving the channel status information for the multiple serving cells on a sub-frame based on the transmitted information, if (a) a UE is configured with more than one cell, (b) a collision occurs between the channel status information for the multiple serving cells, and (c) the channel status information for the multiple serving cells are a same priority.

7. The method of claim 6, wherein the channel status information for each of the multiple serving cells is transmitted on a Physical Uplink Shared Channel (PUSCH).

8. The method of claim 7, further comprising transmitting resource information comprising at least one of information about a transmission resource quantity for the PUSCH and information about a resource block for the PUSCH.

9. The method of claim 6, wherein transmitting information related to the period and the offset indicates that multiple periodic channel information can be transmitted on one sub-frame.

10. The method of claim 9, further comprising receiving channel status information from among the channel status information for each of multiple serving cells, if the information indicating multiple periodic channel information can be transmitted on one sub-frame is not received.

11. An apparatus for transmitting channel information, the apparatus comprising:
 a controller for identifying information related to a period and an offset on channel status information for each of multiple serving cells; and
 a transmitter for transmitting the channel status information for the multiple serving cells on a sub-frame based on the identified information, if (a) a UE is configured with more than one cell, (b) a collision occurs between the channel status information for the multiple serving cells, and (c) the channel status information for the multiple serving cells are a same priority.

12. The apparatus of claim 11, wherein the channel status information for each of the multiple serving cells is transmitted on a Physical Uplink Shared Channel (PUSCH).

13. The apparatus of claim 12, further comprising a receiver for receiving resource information comprising at least one of information about a transmission resource quantity for the PUSCH and information about a resource block for the PUSCH.

14. The apparatus of claim 11, further comprising a receiver for receiving information indicating that multiple periodic channel information can be transmitted on one sub-frame.

15. The apparatus of claim 14, wherein the transmitter transmits channel status information from among the channel status information for each of multiple serving cells, if the information indicating multiple periodic channel information can be transmitted on one sub-frame is not received.

16. An apparatus for receiving channel information, the method comprising:
 a transmitter for transmitting information related to a period and an offset on channel status information for each of multiple serving cells; and
 a receiver for receiving the channel status information for the multiple serving cells on a sub-frame based on the transmitted information, if (a) a UE is configured with more than one cell, (b) a collision occurs between the channel status information for the multiple serving cells, and (c) the channel status information for the multiple serving cells are a same priority.

17. The apparatus of claim 16, wherein the channel status information for each of the multiple serving cells is transmitted on a Physical Uplink Shared Channel (PUSCH).

18. The apparatus of claim 17, wherein the transmitter transmits resource information comprising at least one of information about a transmission resource quantity for the PUSCH and information about a resource block for the PUSCH.

19. The apparatus of claim 16, wherein the information related to the period and the offset indicates that multiple periodic channel information can be transmitted on one sub-frame.

20. The apparatus of claim 19, wherein the receiver receives channel status information among the channel status information for each of multiple serving cells, if the information indicating multiple periodic channel information can be transmitted on one sub-frame is not received.

* * * * *